Dec. 29, 1970     L. P. VELOZ     3,551,091
COMBINATION WATER FILTER AND STERILIZER
Filed July 1, 1968
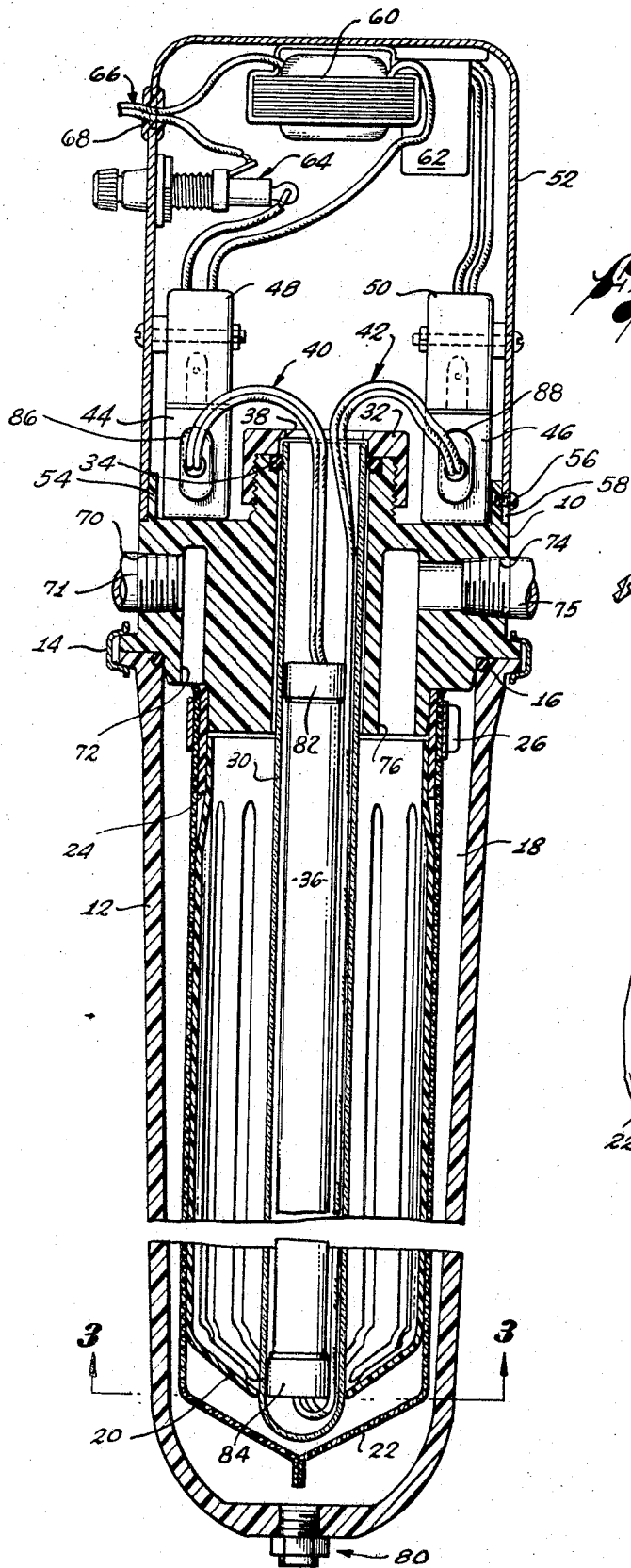
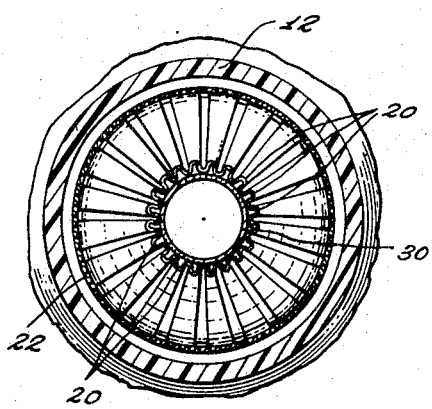
INVENTOR.
LOUIS P. VELOZ
BY Perry E. Turner
ATTORNEY United States Patent Office 3,551,091
Patented Dec. 29, 1970

3,551,091
COMBINATION WATER FILTER
AND STERILIZER
Louis P. Veloz, 500 S. Madison Ave.,
Pasadena, Calif. 91106
Filed July 1, 1968, Ser. No. 741,367
Int. Cl. A61l 3/00
U.S. Cl. 21—102                                    9 Claims

ABSTRACT OF THE DISCLOSURE

An elongated ultraviolet lamp is surrounded by a quartz tube having a closed end extending vertically into a chamber in a support body. A filter support sleeve surrounds the quartz tube, and a filter sock is attached to the sleeve. The body has inlet and outlet ports above the filter. On top, the body releasably supports an electrical housing from which a power cord extends, and wherein electrical connections to the lamp are made via mating plugs carried by the housing and the body. Water entering the inlet is filtered and directed upwardly along the quartz tube for sterilization.

BACKGROUND OF THE INVENTION

(1) Field of the invention

This invention relates to water purifiers, and more particularly to a unique and compact filter and sterilizer combination for furnishing purified water on demand.

(2) Description of the prior art

In trailers, campers, boats and the like, it is customary to carry a supply of water for drinking purposes. However, the tank may be filled at locations where the water may not be safe enough to drink. Accordingly, a purifier is needed. Such purifiers as heretofore known take the form of a filter unit wherein a filter is positioned between the inlet and outlet of a housing, such inlet being connected to the tank. In a further installation, filtered water from the outlet passes into a second unit housing in which there is a source of ultraviolet light inside a quartz tube. In the second unit, water passes around the quartz tube. Water drawn from the second unit is thus filtered and sterilized, and is safe to drink.

The filter must be replaced fairly frequently, e.g., once a month. This of course necessitates disconnecting the filter unit from the tank and the lamp housing, as by closing valves, and then draining and opening the filter unit to remove the filter and replace it with a new one.

Less frequently, the ultraviolet lamp burns out and must be replaced. However, the quartz tube must frequently be wiped off. Here, too, it is ncessary to cut off water flow into the lamp unit, and drain and open it to wipe the quartz tube.

These various operations are unduly time consuming, and accordingly are often neglected until a filter is so clogged as to limit or stop water flow. Such neglect also is accompanied by a marked buildup of film on the quartz tube, which means the ultraviolet lamp is unable to sterilize the water properly. Further, the units take up an undesirable amount of space and are unduly heavy for situations where space and weight are at a premium.

SUMMARY OF THE INVENTION

My invention embraces a housing forming a chamber for a filter that surrounds a quartz tube in which an ultraviolet lamp is located with the parts shaped so that water entering the chamber is directed through the filter and caused to follow a path along the quartz tube from one end of the lamp to the other. Water drawn from the chamber is thus filtered and sterilized in a single compact unit.

Also embraced by my invention is an arrangement for releasably attaching the parts to a support body to permit their removal, replacement, and cleaning with a minimum of time and effort. Still further, my invention embraces the additional feature of an electrical housing to be detachably secured to the body, and wherein such housing and the body carry mating plugs for electrically connecting the lamp to a power source.

BRIEF DESCRIPTION OF THE DRAWING

FIG. 1 is a longitudinal sectional view of a combined filter and sterilizer unit of my invention;

FIG. 2 is a fragmentary sectional view of the filter support sleeve in the arrangement of FIG. 1; and FIG. 3 is a sectional view taken along the line 3—3 of FIG. 1.

DESCRIPTION OF THE PREFERRED EMBODIMENT

Referring to FIGS. 1–3, there is shown a body 10 having a lower housing 12 releasably secured thereto, as by a clamp 14. An O-ring 16 is loacted between confronting portions of the body 10 and housing 12 to form a watertight seal when the clamp 14 is in place. The clamp may be a split ring having an over-the-center mechanism for drawing the ends of the ring together, e.g., a Marman clamp.

The housing 12 forms a chamber 18 for a filter and sterilizer combination of my invention. In this connection, a filter support sleeve 20 inside the chamber extends below the body 10, and is surrounded by a filter element 22. The filter 22 is in the form of a sock having its open end extending above the upper end of the sleeve 20. A compressible band 24 inside the upper portion of the filter 22 spans or laps the abutting portions of the body 10 and the sleeve 20. A ring clamp 26 surrounding the upper end of the filter 22 also spans abutting portions of the body 10 and tube 20. The clamp 26 may be operable in the same manner as the clamp 14, whereby to releasably clamp the body 10, sleeve 20 and filter 22 together.

Extending through the body 10 and sleeve 20 is a quartz tube 30 which is closed at its lower end. As shown, the closed end of the quartz tube 30 extends below and is centered in the lower end of the sleeve 20. The upper end of the quartz tube 30 extends through the body 10, where a nut element 32 is threaded onto the upper end of the body 10. As shown, an O-ring 34 is located between confronting portions of the body 10 and nut 32, for sealingly engaging the outer surface of the quartz tube 30.

An elongated ultraviolet lamp 36 is located in the quartz tube 30, and wire connections for the lamp 36 extend through the quartz tube and out of an opening 38 in the nut 32. These connections, indicated at 40, 42, extend to respective male plugs 44, 46 which are supported on the upper end of the housing 10. Mating plugs 48, 50 are secured in a housing 52 which is adapted to be releasably secured to the body 10. The diameter of the nut opening 32 is less than the outer diameter of the quartz tube, thus providing a stop to prevent water pressure from forcing the quartz tube up through the body 10.

The body 10 is shown having an upper rim or skirt 54 into which a screw 56 is threaded. The housing 52 is slotted at 58 to allow it to be slipped over the shank of the screw 56, which is tightened to secure the housing in place. The housing may have an additional such slot in the body 10 an additional pin or screw, which preferably is less than 180° displaced from the screw 56 and slot 58. In this manner, I insure that the housing 52 cannot be improperly placed on the body 10, but will be seated on the body so that associated plugs are properly mated.

If desired, the electrical housing 52 may, as shown, incorporate a ballast 60 and starter 62 for the lamp 36, and appropriate connections to the plugs 48, 50. In the arrangement shown, a fuse 64 is secured in the housing 52, and appropriate connections from the plugs 48, 50 to the ballast, starter and fuse are provided for connecting the lamp 36 to a power cord 66 extending from the housing. The cord 66 is shown extending through a rubber grommet 68 in the wall of the housing 52. Preferably the cord 66 is connected to a voltage source for continuously operating the lamp 36.

The body 10 has an inlet port 70 into which may be threaded a nipple or pipe connection 71 from a water tank, or alternatively from a pump that is connected to the water tank. The inlet port 70 is in fluid communication with the portion of the chamber 18 surrounding the filter 22, as through an opening 72. The body 10 is also provided with an outlet port 74, which may be threaded for connection to a nipple or pipe connection 75 to an outlet valve or faucet (not shown). Outlet port 74 is in communication with the interior of the sleeve 20, as through an opening 76 from the body 10 into the upper end of the sleeve 20.

Thus, when the faucet is opened, water entering the body 10 passes into the space between the filter 22 and the surrounding housing 12. Such entering water passes through the filter 22 and is directed to the lower end of the sleeve 20, and thence upwardly along the quartz tube 30 and through the opening 76 and outlet port 74. Thus, filtered water is caused to travel a substantial distance while exposed to the ultraviolet light from the lamp 36, thereby insuring that water leaving the outlet port 74 is purified.

To facilitate movement of the water, the sleeve 20 is suitably shape dto provide passages in its outer wall for water that passes through the filter 22. In this connection, FIG. 2 shows the sleeve 20 formed with a plurality of vertical grooves 20'. The grooves are of such width as to prevent the filter 22 from being forced into them by the surrounding water pressure.

The lower end of the sleeve 20 is reduced in diameter, and aids in keeping the quartz tube 30 centered in the housing 12. Additionally, the lower end of the sleeve 20 (see FIG. 3) is scalloped or otherwise irregularly shaped so as to admit water into the interior of the sleeve 20.

Replacing the filter 22 and cleaning the sleeve 20 and quartz tube 30 is a simple matter. To remove the filter all that is necessary is to turn a valve at the water tank (not shown) to stop flow of water to the body 10, drain the chamber 18 via a needle valve 80 in the lower end of the housing 12, as by loosening a nut thereof, removing the ring clamp 14 and housing 12, and then removing the ring clamp 26, sleeve 20 and filter 22. At this time, the sleeve 20 and the quartz tube 30 can be wiped. Then a new filter sock is placed over the sleeve 20 and, with the band 24 positioned as shown in FIG. 1, the ring clamp 26 is tightened to secure the sleeve 20 and new filter to the body 10. Then the housing 12 is positioned against the body 10 and the ring clamp 14 tightened to secure them together. The needle valve 80 is closed, thereby completing the reassembly.

As will be apparent, disassembling and reassembling the above-described parts is a simple matter, requiring no tools, and permitting their operations to be performed by persons untrained and unskilled in the use of tools. Further, disassembly of my unit automatically exposes the quartz tube and sleeve for cleaning each time a filter is removed for replacement.

Replacement of the ultraviolet lamp 36 is likewise an extremely simple procedure. To do this, all that is necessary is to loosen the screw 56 and lift off the electrical housing (thereby separating the plugs 44, 48 and 46, 50), raise the lamp 36 out of the quartz tube 30, and disconnect the leads 40, 42 from the ends of the lamp (via conventional bi-pin sockets 82, 84. If desired, the leads 40, 42 may be removably electrically connected through plugs 86, 88 to the plugs 44, 46. Thus, the leads of a burned out lamp can be unplugged at 86, 88 and raised to pull the lamp through the nut 32, and then disconnected at 82, 84. The leads are then connected to the ends of a new lamp, which is lowered through the nut into the quartz tube, and the leads are then connected to the plugs 44, 46 at 86, 88.

A filter and sterilizer combination of my invention is inexpensive to manufacture. The body 10, housing 12 and sleeve 20 may be made of rigid plastic, e.g., polypropylene, cycolac or other suitable plastic approved for use for water. The band 24 may be made of compressible neoprene, and the filter 22 may be formed of polypropylene felt. Desirably, the housing 12, filter 22 and sleeve 20 are made of translucent plastic, so that the user can observe whether the lamp 36 is in operation. When there is no glow, the user is alerted that the lamp has burned out and must be replaced.

The compactness and lightweight construction of the filter and sterilizer combination above described is illustrated by an example, which is only 19 inches long and 4½ inches in outer diameter, the total weight of the combination being less than five pounds. The filter and sterilizer combination of this example has a filter for removing particles as small as ten microns, and a ten-inch, 8-watt lamp having a lamp life of 7,500 hours. This device has a capacity of a half gallon per minute, and operates under a water pressure of 90 p.s.i. Such a device is uniquely adapted for a multitude of uses where purified water is needed. For example, such a device is useful at a soda fountain to provide a constant source of purified water for use in mixing carbonated beverages.

From the foregoing, it will be apparent that various modifications can be made in the filter and sterilizer combination shown and described without departing from the spirit and scope of my invention. Accordingly, I do not intend that my invention be limited, except in accordance with a reasonable interpretation of the appended claims.

I claim:

1. In combination:
a body having a chamber therein;
an imperforate sleeve extending into said chamber;
a filter element around said sleeve,
    said body having an inlet port communicating with the space around said filter element;
a quartz tube inside said sleeve;
an ultraviolet lamp in said quartz tube,
    said body having an outlet port communicating with the space between said sleeve and quartz tube,
    and said sleeve and filter being shaped to cause water entering said inlet port to pass through said filter and enter the space between the sleeve and quartz tube at the end of said sleeve remote from said outlet port.

2. The combination of claim 1, including:
a hollow housing closed at one end;
means releasably and sealingly securing the open end of said housing to said body,
    said chamber being constituted of the interior of said housing;
and means releasably and sealingly securing the end of said sleeve adjacent said outlet port to said body.

3. The combination of claim 2, wherein said filter element is in the form of a sock fitted over said sleeve, the open end of said filter element being releasably secured to said adjacent end of said sleeve.

4. The combination of claim 3, wherein the end of said quartz tube remote from said outlet port is closed;
and valve means in said housing to permit said housing to be drained.

5. The combination of claim 4, wherein the open end of said quartz tube extends through an opening in said housing;
a nut element threaded to said body and disposed in the path of the open end of said quartz tube; and
a ring seal surrounding said quartz tube in said opening,
    said nut when threaded to said body causing said ring seal to form a seal between said quartz tube and said body.

6. The combination of claim 5, wherein said nut element has a central opening;
electrical leads from the lamp extending through said quartz tube and the opening in said nut element;
male plug means carried on said body;
an electrical housing removably secured to said body;
female plug means carried in said electrical housing and adapted to matingly engage said male plug means when said electrical housing is placed on said body; and
electrical connections from said female plug means extending to the exterior of said electrical housing.

7. The combination of claim 6, wherein said leads are removably electrically connected to said male plug means.

8. The combination of claim 7, including indexing means for said electrical housing to cause said plug means to be automatically mated when said electrical housing is fitted onto said body.

9. The combination of claim 8, including a ballast and starter for said lamp;
and means connecting said ballast and starter in circuit with said female plug means and exterior electrical connections.

References Cited
UNITED STATES PATENTS

| | | | |
|---|---|---|---|
| 1,441,075 | 1/1923 | Fitz | 210—192 |
| 2,623,367 | 12/1952 | Morrison | 250—43X |
| 3,456,107 | 7/1969 | Robertson | 21—102X |

MORRIS O. WOLK, Primary Examiner

B. S. RICHMAN, Assistant Examiner

U.S. Cl. X.R.

210—152, 192; 250—43, 48